United States Patent
Peisa et al.

(10) Patent No.: US 8,548,480 B2
(45) Date of Patent: Oct. 1, 2013

(54) RADIO RESOURCE USAGE OPTIMISATION IN A PACKET NETWORK

(75) Inventors: Janne Peisa, Espoo (FI); Mats Sågfors, Kyrkslätt (FI); Johan Torsner, Esbo (FI); Stefan Wager, Esbo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/438,317

(22) Filed: Apr. 3, 2012

(65) Prior Publication Data

US 2012/0188933 A1 Jul. 26, 2012

Related U.S. Application Data

(62) Division of application No. 10/571,607, filed as application No. PCT/EP2004/051725 on Aug. 5, 2004, now abandoned.

(30) Foreign Application Priority Data

Sep. 12, 2003 (GB) .................................. 0321425.1

(51) Int. Cl.
*H04W 76/00* (2009.01)

(52) U.S. Cl.
USPC ........ 455/445; 455/561; 455/422.1; 455/405; 370/328; 370/394; 370/352; 714/748

(58) Field of Classification Search
USPC .............. 455/561, 414.3, 405, 450, 433, 434, 455/447, 445, 406, 422.1; 370/352, 329, 370/389, 252, 354, 328, 392, 394, 400, 428; 714/748, 749; 379/221.08, 114.29, 240, 379/410

See application file for complete search history.

(56) References Cited

U.S. PATENT DOCUMENTS

| | | | |
|---|---|---|---|
| 6,493,328 B2 * | 12/2002 | Fong et al. .................... | 370/329 |
| 6,628,672 B1 * | 9/2003 | Cabello ........................ | 370/474 |
| 7,054,268 B1 | 5/2006 | Parantainen et al. | |
| 7,860,087 B2 * | 12/2010 | Kim .............................. | 370/389 |
| 2002/0048268 A1 | 4/2002 | Menon et al. | |
| 2002/0054578 A1 | 5/2002 | Zhang et al. | |
| 2002/0057706 A1 * | 5/2002 | Michiel ........................ | 370/412 |
| 2002/0110095 A1 * | 8/2002 | Jiang et al. ................... | 370/328 |
| 2002/0150048 A1 | 10/2002 | Ha et al. | |
| 2002/0172208 A1 * | 11/2002 | Malkamaki .................. | 370/400 |
| 2003/0054807 A1 * | 3/2003 | Hsu et al. ..................... | 455/414 |
| 2003/0156580 A1 | 8/2003 | Abraham | |
| 2003/0179720 A1 | 9/2003 | Cuny | |
| 2003/0207696 A1 | 11/2003 | Willenegger et al. | |
| 2004/0047361 A1 | 3/2004 | Fan et al. | |

(Continued)

OTHER PUBLICATIONS

Shen et al , QOS Guaranteeing during UMTS packet-domain handover, IEEE Xplore Digital Library, Aug. 27-29, 2003.*

(Continued)

*Primary Examiner* — Mahendra Patel
(74) *Attorney, Agent, or Firm* — Nixon & Vanderhye, P.C.

(57) ABSTRACT

A method of optimizing the use of radio resources in a mobile radio communication system during a combinational multimedia session involving circuit switched and packet switched sessions between user terminals, the method comprising: disabling an in-sequence delivery option of packets between radio network control nodes of the radio access network(s) serving the user terminals for said packet switched session.

10 Claims, 2 Drawing Sheets

(56) References Cited

U.S. PATENT DOCUMENTS

| | | | |
|---|---|---|---|
| 2004/0047437 A1* | 3/2004 | Hamiti et al. | 375/326 |
| 2004/0176090 A1* | 9/2004 | Mudigonda et al. | 455/434 |
| 2004/0266391 A1* | 12/2004 | Hafren | 455/405 |
| 2005/0101245 A1 | 5/2005 | Ahmavaara | |
| 2005/0129013 A1* | 6/2005 | Rasanen | 370/389 |

OTHER PUBLICATIONS

3GPPTS 32.225, $3^{rd}$ Generation Partnership Project; Technical Specification Group Service and System Aspects; Telecommunication Management; Charging Management; Charging Data Description for the IP Multimedia Subsystem (IMS), (Release 5), V5.0.0, (Sep. 2002).

International Search Report for PCT/EP2004/051725 dated May 9, 2005.

Shen et al., *QoS guaranteeing during UMTS packet-domain handover*, Proceedings of the Fourth International Conference on Parallel and Distributed Computing, Applications and Technologies, PDCAT 2003, Aug. 27, 2003, pp. 387-390, XP010661303.

* cited by examiner

RADIO RESOURCE USAGE OPTIMISATION IN A PACKET NETWORK

This application is a divisional application of U.S. patent application Ser. No. 10/571,607, filed Mar. 10, 2006, now abandoned which is the U.S. national phase of international application PCT/EP2004/051725 filed 5 Aug. 2004, which designated the U.S. and claims benefit of GB 0321425.1 filed 12 Sep. 2003, the entire contents of each of which are hereby incorporated by reference.

FIELD OF THE INVENTION

The technology disclosed herein relates to combinational multimedia services and more particularly to a method of optimising the data transmission associated with such service.

BACKGROUND

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

IP Multimedia Subsystem (IMS) is the technology defined (in TS 32.225, Release 5) by the Third Generation Partnership Project (3GPP) to provide IP Multimedia services over 3G mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) and Service Delivery Protocol (SDP) to set up and control calls or sessions between user terminals (or user terminals and web servers). IMS sits on top of an access network which would typically be a General Packet Radio Service (GPRS) network but which might use some alternative technology, e.g. WiFi. FIG. 1 illustrates schematically how the IMS fits into the mobile network architecture in the case of a GPRS access network.

An example of a combinational IP Multimedia service is a multimedia service that includes and combines both a Circuit Switched media (such as voice) and a Packet Switched media over the IP Multimedia domain (such as pictures, video, presence, instant messages, etc.). A service referred to here as "WeShare" combines the full IP Multimedia Subsystem (IMS) benefits of a multimedia service with CS voice. The service enables a user, during a Circuit Switched (CS) voice conversation with another user, to take a picture, a video or audio clip, etc. and to share this content with other users in (near) real time. Either party in the conversation may initiate transmission of content to the other party.

SUMMARY

FIG. 2 illustrates schematically the Radio Link configuration for the Push-To-Watch service. The transport chain of the Push-To-Watch service comprises two cascaded radio links as shown in FIG. 2. In the state of the art solution, these links are totally decoupled, meaning that retransmissions and window control is done separately without coordination. Assuming both radio link protocols perform selective repeat ARQ with in-sequence delivery (as used in most cellular systems), this may lead to a situation where the buffers of the Radio Link B drain because Radio Link A is performing retransmissions.

Consider the following example. Radio Link A is performing a retransmission of a Protocol Data Unit (PDU) number 3 from Terminal A to UTRAN A (that is the RNC of UTRAN A). Because of the selective repeat function, UTRAN A continues to receive PDU numbers 4 and 5, but because of the in-sequence delivery function, it is unable to forward any packets to UTRAN B (that is the RNC of UTRAN B) until the missing PDU number 3 is received correctly. This behavior is well known and will produce a certain jitter in the outgoing data flow of Radio Link A. Because of the selective repeat function of the radio link protocol, the radio link utilization in UTRAN A will however remain good as long as the window is open. The problem occurs in Radio Link B, where the jitter in the incoming data flow from UTRAN A may cause the buffer at UTRAN B to drain, causing radio link under utilization, which in turn prolongs the picture transfer time.

It is an object of the technology disclosed herein to optimise radio resource usage in a packet network and in particular to optimise the radio link layer performance for the so-called "Push-To-Watch" service to be offered by mobile wireless network operators. The Push-To-Watch service involves exchanging pictures on a packet switched (PS) connection between users whilst a circuit switched (CS) voice call is active.

According to a first aspect of the technology disclosed herein there is provided a method of optimising the use of radio resources in a mobile radio communication system during a combinational multimedia session involving circuit switched and packet switched sessions between user terminals, the method comprising:

disabling an in-sequence delivery option of packets at one or both of the radio network control nodes of the radio access network(s) serving the user terminals for said packet switched session.

In a first example embodiment, said packets are Service Data Units, assembled at the sending side radio network controller from Protocol Data Units.

In a second example embodiment, said packets are Protocol Data Units. These units are assembled at the receiving side Terminal into Service Data Units.

According to a second aspect of the technology disclosed herein there is provided a method of operating a radio network controller of a mobile communications network, the method comprising disabling an in-sequence delivery option for packets associated with a packet switched session between two or more user terminals.

A second problem associated with the transmission of packet switched data in a combinational service has been identified. In the state of the art processes, multimedia content such as pictures is transmitted from a user Terminal A to a user Terminal B using an end-to-end Transmission Control Protocol (TCP) connection as already described with reference to FIG. 2. The round trip time (RTT) is great due to the cascaded radio links (A and B). As is well known, TCP defines a window which restricts the number of unacknowledged IP packets which can be in transit at any given time. The window size is increased as acknowledgements are received and is decreased if no acknowledgements are received for some specified period. The rate at which the window is opened depends on the ACKs received at the sender from the receiver. If the ACKs are delayed, the slow start period is prolonged.

During slow start, TCP is not able to fully utilize a given radio link, which means that picture transfer times increase. The pictures transmitted with the push-to-watch service will be relatively small in size, e.g. 3 to 50 kBytes, which means that TCP will mostly be operating in the slow start phase for the period that it takes to send a picture.

According to a third aspect of the technology disclosed herein there is provided a method of optimising the use of radio resources in a mobile radio communication system during a combinational multimedia session involving circuit switched and packet switched sessions between user terminals, the method comprising:

setting one or more TCP sending parameters at at least one user terminal for said packet switched session so as to optimise radio resource usage, the TCP parameter(s) being different from the parameter(s) used for non-combinational multimedia session related packet traffic.

Said TCP sending parameter may be segment size or initial window size.

According to a fourth aspect of the technology disclosed herein there is provided a method of operating a user terminal of a mobile radio communication system, the method comprising:

setting one or more TCP sending parameters for a packet switched session associated with a combinational multimedia session so as to optimise radio resource usage, the TCP parameter(s) being different from the parameter(s) used for non-combinational multimedia session related packet traffic.

DETAILED DESCRIPTION

Figure 1:
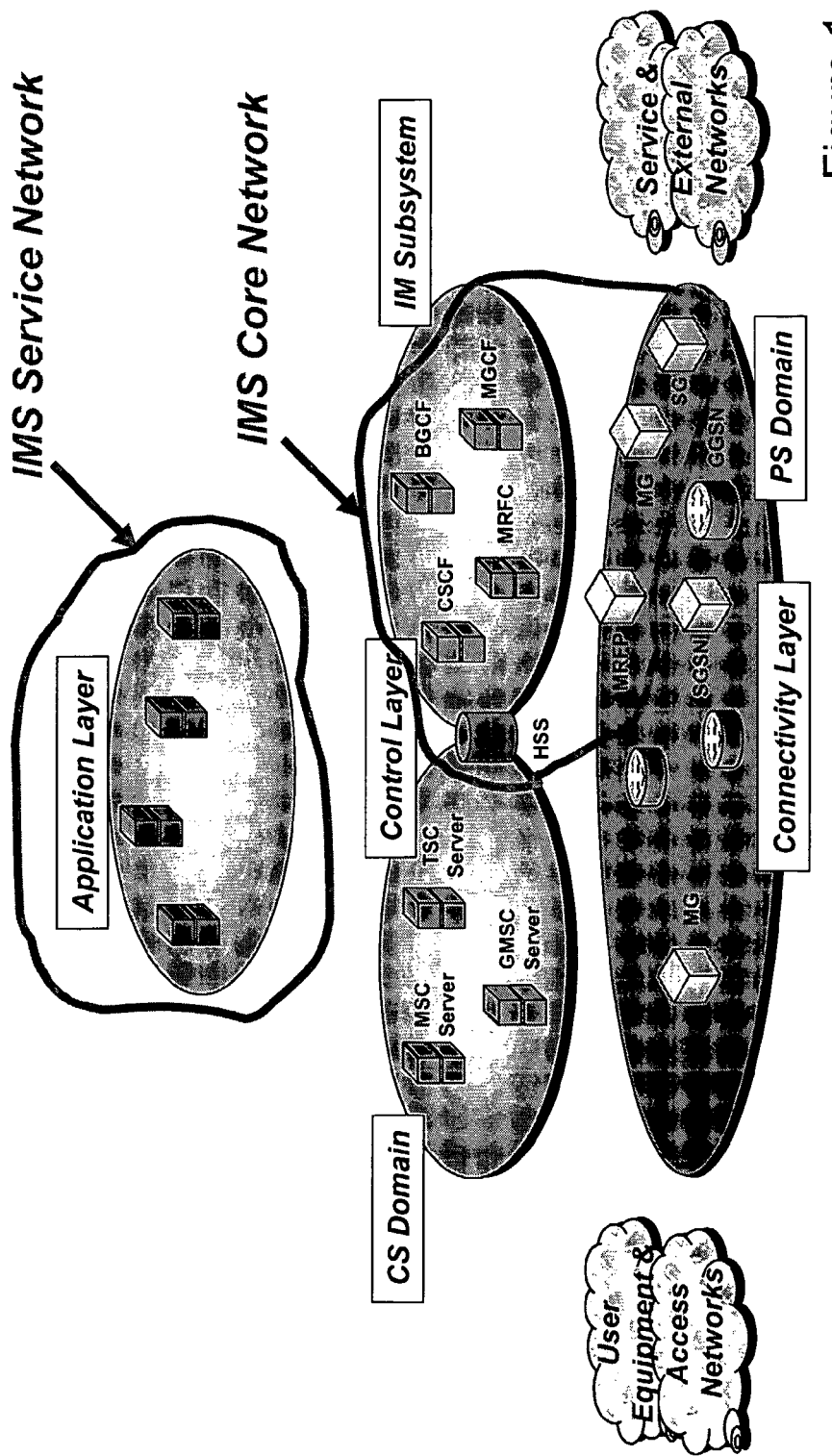
FIG. 1 illustrates schematically a mobile network architecture incorporating IMS.

The Universal Mobile Telecommunications Service (UMTS) provides for a radio access network known as the UMTS Terrestrial Radio Access Network (UTRAN). The two main components of the UTRAN are the Radio Network Controller (RNC) which controls the radio resources, and the Node B which operates as a base station. Different RNCs communicate with each other over the Iur interface. UMTS also provides for a core network which will comprise components for facilitating the General Packet Radio Service (GPRS) which is an example of a packet switched access service. In particular, the core network will contain Serving GPRS Support Nodes (SGSNs) and Gateway GPRS Support Nodes (GGSNs).

UMTS provides for a Radio Link Control (RLC) layer which is responsible for controlling data transmission over the wireless link. Whilst the RLC can operate in a number of modes, the mode of interest here is the "acknowledged" mode which ensures error free transmission for upper layers of the protocol stack. The RLC is located both at the RNC and at the User Equipment (UE). In the case of IP data transmission, the RLC layer receives IP packets from the IP/TCP layers. These are referred to as RLC Service Data Units (SDUs). The RLC segments the SDUs into Protocol Data Units (PDUs) which are passed to the lower protocol layers (particularly the Media Access Control (MAC) layer).

RLC specifies an in-sequence delivery option for SDUs according to which SDUs are delivered to higher layers in sequence. When this option is turned off, an SDU is delivered immediately all PDUs belonging to that SDU have been received, regardless of whether or not earlier SDUs have been successfully received. The in-sequence delivery option may be inhibited by specifying this in the request sent by the core network (e.g. the SGSN) to establish a PS bearer.

As has been discussed above, in the case of user to user data transmission, the RLC buffers at the receiving RNC may become empty due to retransmission requirements at the sending RNC. This results in inefficient use of the wireless interface at the receiving side. The solution proposed here is to disable the in-sequence delivery option at the RNC of the first radio link, (i.e. from Terminal A to the RNC of UTRAN A) for the Push-To-Watch service, upon detection that the Push-To-Watch service has been activated. The IMS may notify the SGSN of the nature of the bearer, allowing the SGSN to inhibit the in-sequence delivery option in the PS bearer setup request sent to the RNC. In a first version this can be done at the Service Data Unit (SDU) level, so that Radio Link A is able to forward an SDU as soon as all of the PDU components have been received. As the RLC layer at the RNC already includes the option to disable of in-sequence delivery, no changes to the relevant RLC protocol are required to implement this solution.

In an alternative embodiment, the reassembly function at the RLC layer of the RNC of Radio Link A is disabled so that the RLC forwards PDUs (i.e. the sub-components of the SDUs) to Radio Link B as soon as they have been correctly received. Radio Link B will then use the same PDUs and sequence numbers as in Radio Link A, reassembling the PDUs into SDUs as they are correctly received in Terminal B. This requires a tunneling of the Radio Link PDUs from Radio Link A to Radio Link B. This approach offers increased granularity in the transmission path, offering the possibility of better use of the radio links. However the price is that the RLC protocol must be changed.

Embodiments of the technology disclosed herein thus improve radio link utilization, and therefore picture transfer times are reduced for the Push-To-Watch service.

Figure 2:
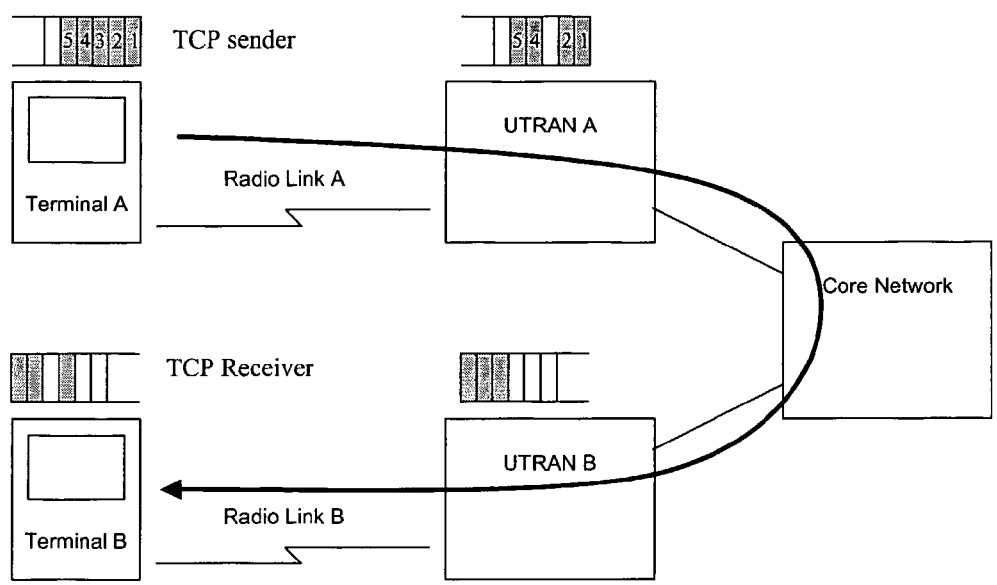
FIG. 2 illustrates schematically a cascaded radio link connecting two user terminals.

A different problem to that addressed by the first and second embodiments arises when the TCP transport protocol is used to control the transport of IP packets between user terminals. As has already been discussed, this problem results from the relatively long Round Trip Time (RTT) of the cascaded radio links (FIG. 2), and the effect that this has on the opening of the TCP transmission window. In the case of Push-to-Watch, the relatively small size of the associated media (e.g. less than 50kbytes) means that the entire media will be transmitted under the slow start conditions. Push-to-Watch is designed as an "immediate" service and the slow start conditions will seriously detract from this.

One solution to this problem would be to use a proprietary protocol for the media (picture etc) transmissions. However, this would inevitably lead to interoperability problems between terminals from different vendors. A preferred solution is to use modified TCP parameters at the TCP sender in dependence upon the service to which the data to be sent relates. For example, when the sender wishes to send picture data associated with Push-To-Watch, the TCP parameters are altered from their "normal" values. TCP parameters to modify are the segment size and initial window. These will affect the slow start performance and are usually used to ensure a fair share of resources between users in the Internet. Because of the closed nature of the transmission chain, a diversion from the normal recommendations is acceptable. The transmission rate of Radio Link A will limit the rate of traffic entering the core network.

The maximum segment size (MSS) shall be set to 1460 bytes (smaller segment sizes will lead to increased IP overheads). The second radio link will be idle until the first segment has traversed Radio Link A, and a larger size will only prolong this time, and therefore also the total picture transfer time. The initial window shall be set as large as possible, still ensuring that the RLC buffers do not overflow or drop packets in Terminal A. Ideally, the initial window is set larger than or equal to the picture size being transmitted. This means that Radio Link A has full utilization immediately and the picture transfer time is then not limited by the transport layer.

This embodiment of the technology disclosed herein helps reduce picture transmission times for the Push-To-Watch service.

The invention claimed is:

1. A method of optimising the use of radio resources in a mobile radio communication system comprising:
    transporting signals over two cascaded radio links during a combinational multimedia session involving circuit switched and packet switched sessions between user terminals associated with respective radio network control nodes;
    at a sending side radio network control node;
        receiving packets from a first of said user terminals; and
        disabling at a Radio Link Control layer an in-sequence delivery option for onward delivery of the received packets to the radio network control nodes of the radio access network(s) serving other of said user terminals for said packet switched session.

2. A method according to claim 1, wherein said packets are Service Data Units, assembled at a Radio Link Control (RLC) layer of the sending side radio network controller, from Protocol Data Units.

3. A method according to claim 1, wherein said packets are Radio Link Control Protocol Data Units which are tunnelled from a sending side radio network controller to a receiving side radio network controller, the Protocol Data Units being assembled at the receiving side terminal into Radio Link Control Service Data Units.

4. A method of operating a radio network controller of a mobile communications network, the method comprising, for transported signals over two cascaded radio links during a combinational multimedia session involving circuit switched and packet switched between user terminals associated with respective radio network control nodes, disabling at a Radio Link Control layer an in-sequence delivery option for packets sent from the radio network controller to another radio network controller and associated with a packet switched session between two or more user terminals.

5. A method according to claim 4, wherein said packets are Radio Link Control Service Data Units.

6. A method according to claim 4, wherein said packets are Radio Link Control Protocol Data Units which are tunnelled from the sending side radio network controller to the receiving side radio network controller.

7. A method of operating a mobile radio communication system comprising:
    detecting activation of a combinational multimedia session involving circuit switched and packet switched sessions between user terminals associated with respective radio network control nodes, where signals are transported over two cascaded radio links; and, in response to the detecting,
    at a sending side radio network control node, receiving packets from a first of said user terminals, while at a Radio Link Control layer disabling an in-sequence delivery option for onward delivery of the received packets to the radio network control nodes of the radio access network(s) serving other of said user terminals for said packet switched session.

8. The method of claim 7, further comprising:
    at a core network of the mobile radio communication system, requesting the sending radio network control node to inhibit the in-sequence delivery option in response to the detecting; and
    enabling the sending radio network control node to forward a Service Data Unit (SDU) as soon as all Protocol Data Units (PDUs) thereof have been received.

9. The method of claim 7, further comprising:
    at the sending radio network control node, disabling a reassembly function at a Radio Link Control (RLC) layer of a first radio link so that the Radio Link Control (RLC) forwards the Protocol Data Units (PDUs) to a second radio link as soon as the PDUs are correctly received; and
    reassembling the PDUs into Service Data Units (SDUs) as the PDUs are correctly received at a receiving radio network control node.

10. A method of optimising the use of radio resources in a mobile radio communication system comprising:
    transporting signals over two cascaded radio links during a combinational multimedia session involving circuit switched and packet switched sessions between user terminals associated with respective radio network control nodes and in which jitter caused by delaying the sending of packets from a sending terminal is a cause of under-utilization of the radio resources;
    at a sending side radio network control node;
        receiving packets from a first of said user terminals; and
        disabling at a Radio Link Control layer an in-sequence delivery option for onward delivery of the received packets to the radio network control nodes of the radio access network(s) serving other of said user terminals for said packet switched session.

* * * * *

UNITED STATES PATENT AND TRADEMARK OFFICE
CERTIFICATE OF CORRECTION

PATENT NO. : 8,548,480 B2  
APPLICATION NO. : 13/438317  
DATED : October 1, 2013  
INVENTOR(S) : Peisa et al.

It is certified that error appears in the above-identified patent and that said Letters Patent is hereby corrected as shown below:

In the Claims

In Column 5, Line 30, in Claim 2, delete "A" and insert -- The --, therefor.

In Column 5, Line 34, in Claim 3, delete "A" and insert -- The --, therefor.

In Column 5, Line 44, in Claim 4, delete "switched between" and insert -- switched sessions between --, therefor.

In Column 5, Line 50, in Claim 5, delete "A" and insert -- The --, therefor.

In Column 5, Line 52, in Claim 6, delete "A" and insert -- The --, therefor.

Signed and Sealed this
Twenty-second Day of July, 2014

Michelle K. Lee
*Deputy Director of the United States Patent and Trademark Office*